United States Patent
Polehn

(10) Patent No.: US 9,838,159 B2
(45) Date of Patent: Dec. 5, 2017

(54) CORRECTION OF DEMODULATION ERRORS BASED ON MACHINE LEARNING

(71) Applicant: Verizon Patent and Licensing Inc., Arlington, VA (US)

(72) Inventor: Donna L. Polehn, Kirkland, WA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 24 days.

(21) Appl. No.: 14/953,931

(22) Filed: Nov. 30, 2015

(65) Prior Publication Data
US 2017/0155476 A1    Jun. 1, 2017

(51) Int. Cl.
| | |
|---|---|
| *H04L 1/18* | (2006.01) |
| *H04L 1/08* | (2006.01) |
| *H04L 27/06* | (2006.01) |
| *H04L 27/22* | (2006.01) |

(52) U.S. Cl.
CPC ............ *H04L 1/08* (2013.01); *H04L 27/06* (2013.01); *H04L 27/22* (2013.01)

(58) Field of Classification Search
CPC ............ H04L 1/08; H04L 27/22; H04L 27/06
See application file for complete search history.

(56) References Cited

U.S. PATENT DOCUMENTS

2013/0339813 A1* 12/2013 Suresh ............... H04L 1/1812 714/751
2015/0381322 A1* 12/2015 Homchaudhuri . H04W 52/0245 370/242

\* cited by examiner

*Primary Examiner* — Thien D Nguyen

(57) ABSTRACT

A method, a device, and a non-transitory storage medium having instructions to receive data and first channel information pertaining to a transmission of the data; store first constellation data and demodulate the data; determine whether any error exists pertaining to the data; receive retransmitted data and second channel information when an error exists; demodulate the retransmitted data; calculate error vector magnitude data; generate corrective constellation data based on the error vector magnitude data, the first channel information, and the second channel information, wherein the corrective constellation data includes at least one reference constellation point that is repositioned on a constellation plane relative to at least one corresponding reference constellation point of a default constellation data; and use the corrective constellation data when demodulating additional data that is subsequently received.

20 Claims, 16 Drawing Sheets

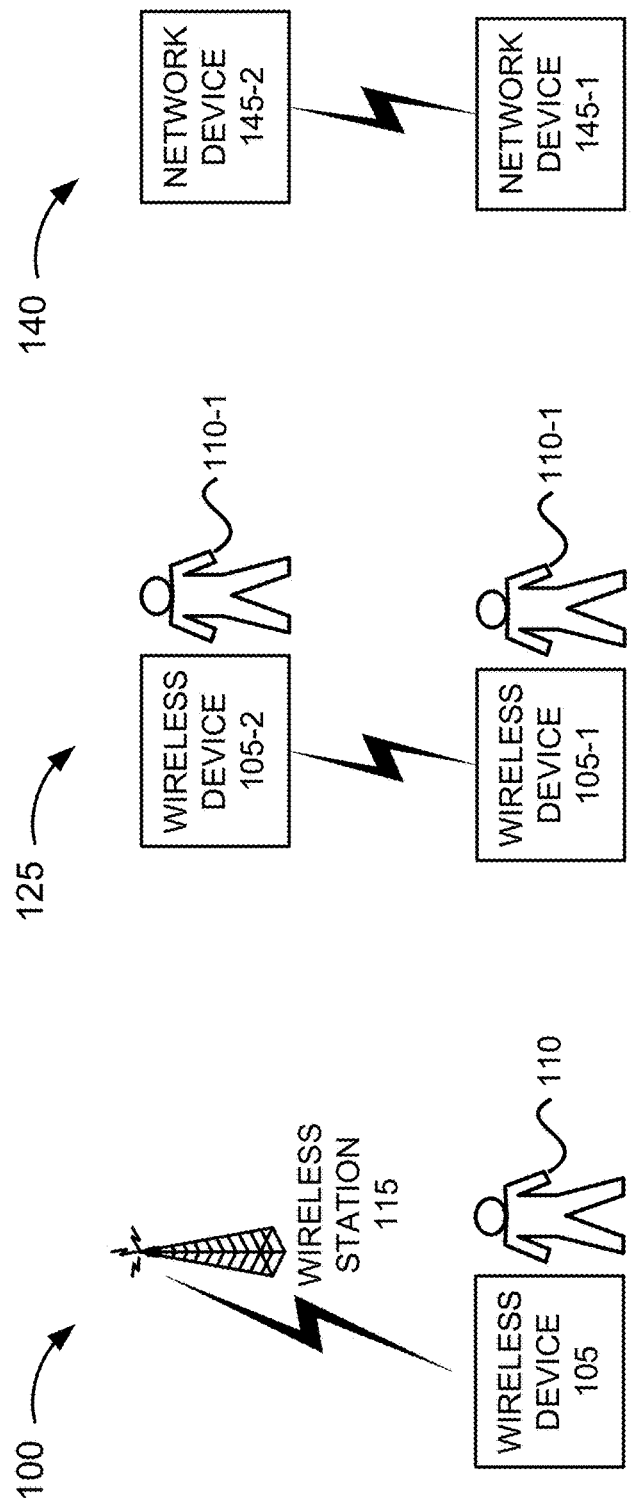

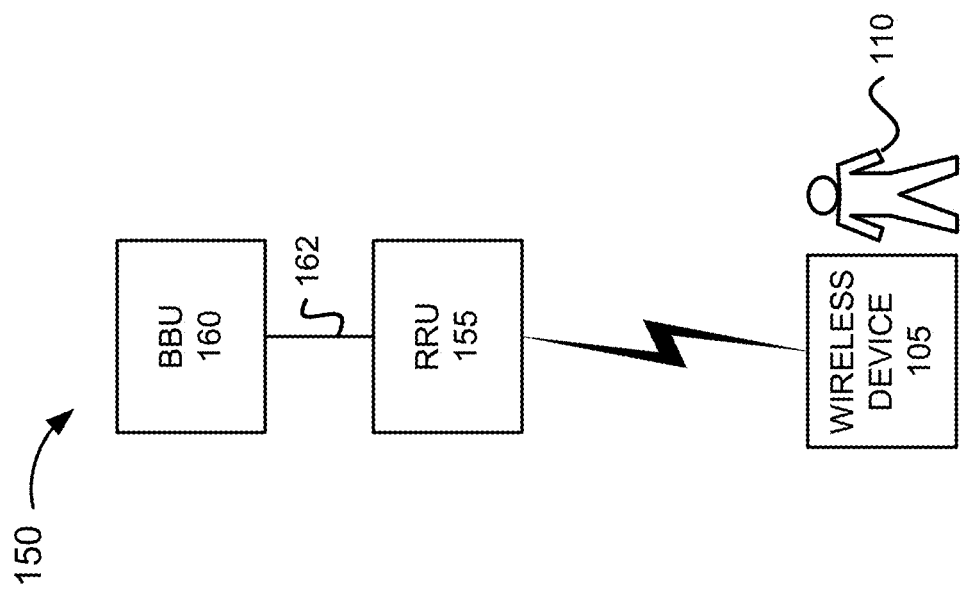

| CHANNEL INFORMATION | CONSTELLATION POINT DATA | EVM | ERROR BITS | CORRECT BITS | CORRECTIVE SIGNAL CONSTELLATION MATRIX |
|---|---|---|---|---|---|
| ← 405 | ← 410 | ← 415 | ← 420 | ← 425 | ← 430 |

TABLE 400

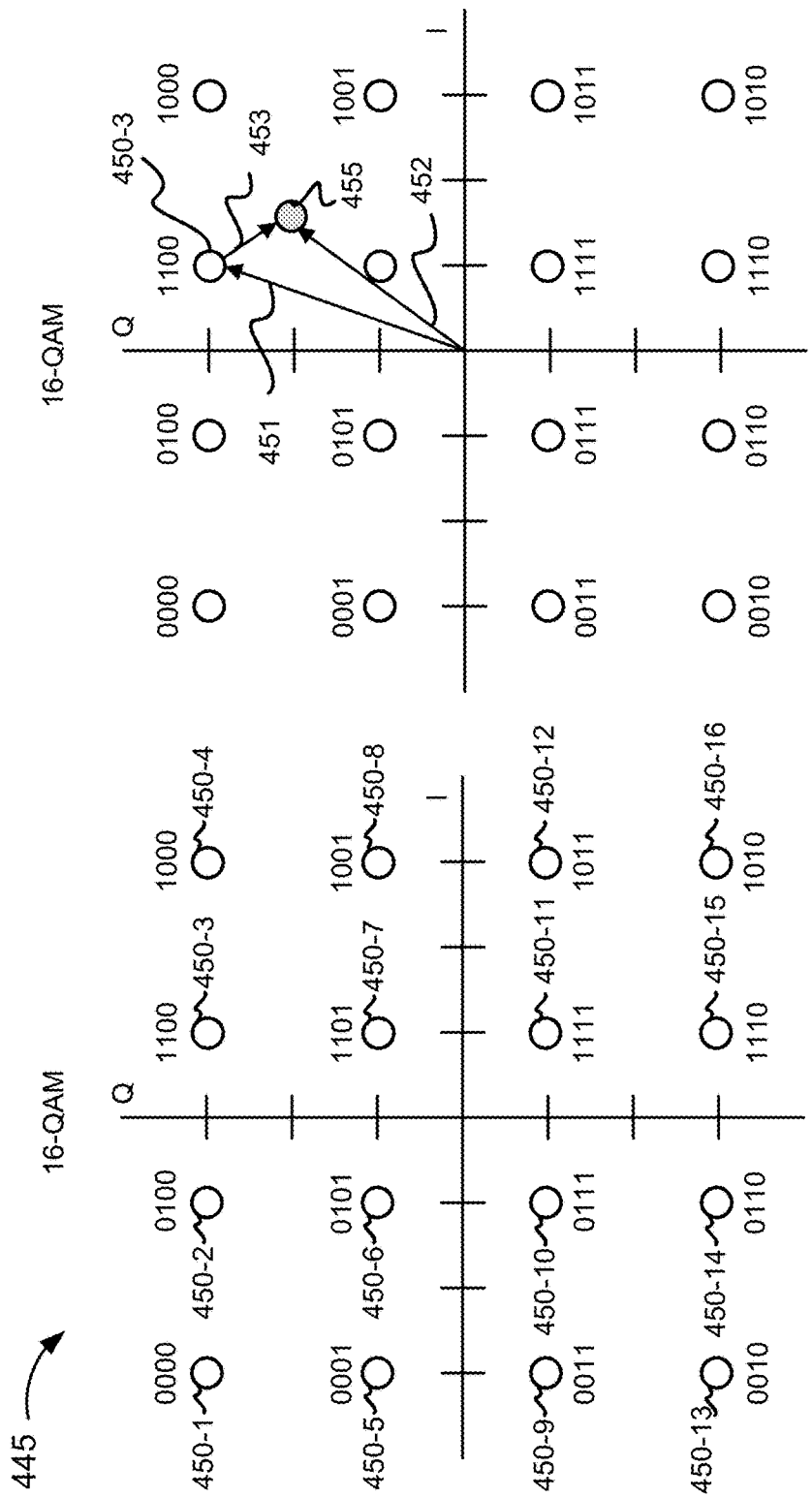

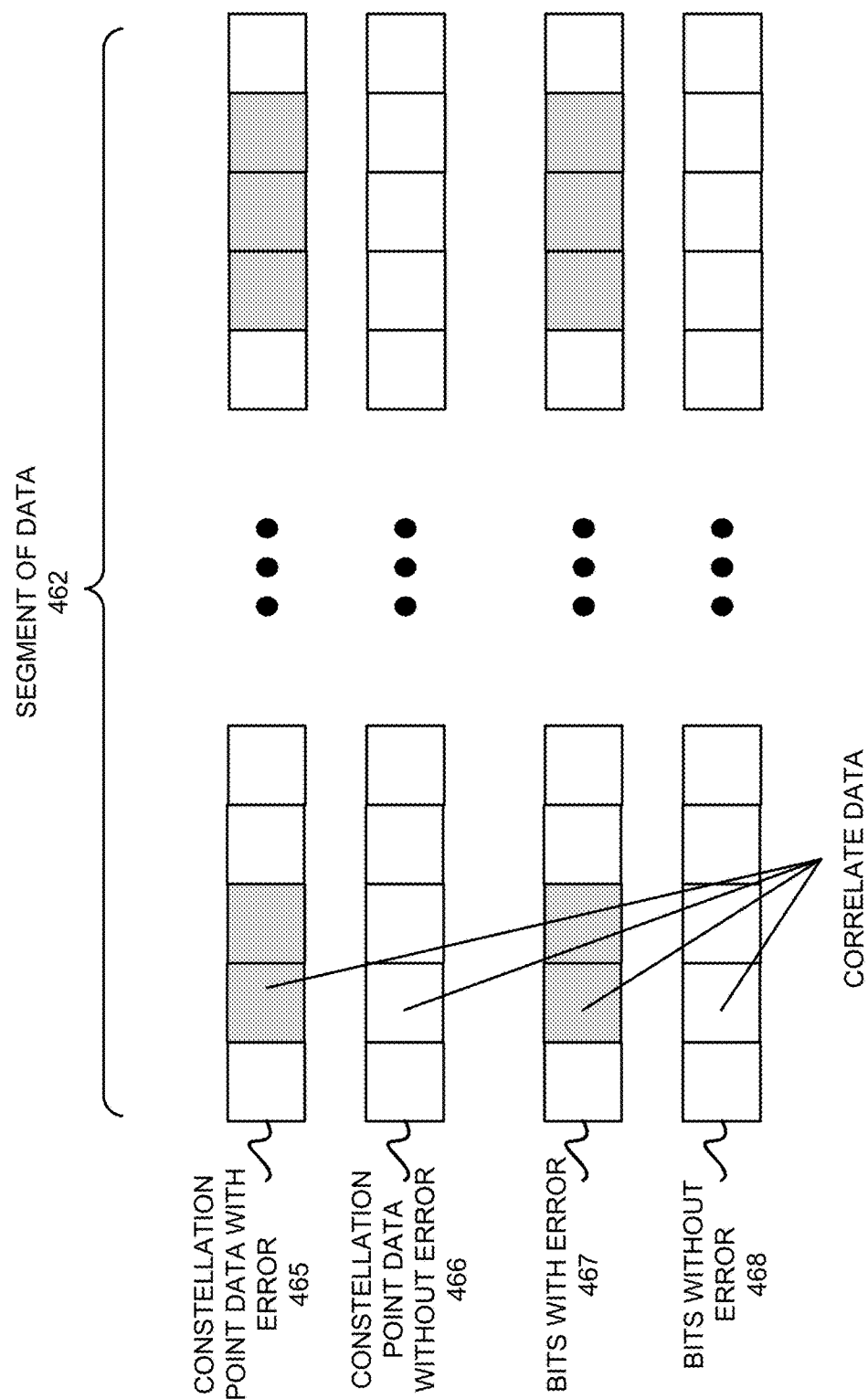

CORRECTION OF DEMODULATION ERRORS BASED ON MACHINE LEARNING

BACKGROUND

In wireless networks, wireless devices can suffer performance issues due to the wireless channel conditions as well as the characteristics of the components included in the wireless devices. For example, when a wireless device transmits data to another wireless, the data received at the receiving wireless device may be subject to errors based on the wireless conditions, synchronization errors, etc. In some cases, the errors can be corrected based on error correction techniques, signal processing techniques, and so forth. In other cases, the errors cannot be corrected and the wireless devices have to retransmit the data.

BRIEF DESCRIPTION OF THE DRAWINGS

FIGS. 1A-1D are diagrams illustrating exemplary environments in which exemplary embodiments of a correction service may be implemented;

FIG. 4A is a diagram illustrating an exemplary table that stores exemplary correction service data;

FIG. 4B is a diagram illustrating an exemplary 16-Quadrature Amplitude Modulation (QAM) constellation diagram;

FIGS. 4C and 4D are diagrams illustrating error vectors relative to the 16-QAM constellation diagram;

FIG. 4E is a diagram illustrating an exemplary corrective signal constellation diagram;

FIGS. 4F and 4G are diagrams illustrating an exemplary process pertaining to a generation of error vector magnitude data;

DETAILED DESCRIPTION OF PREFERRED EMBODIMENTS

Figure 2:
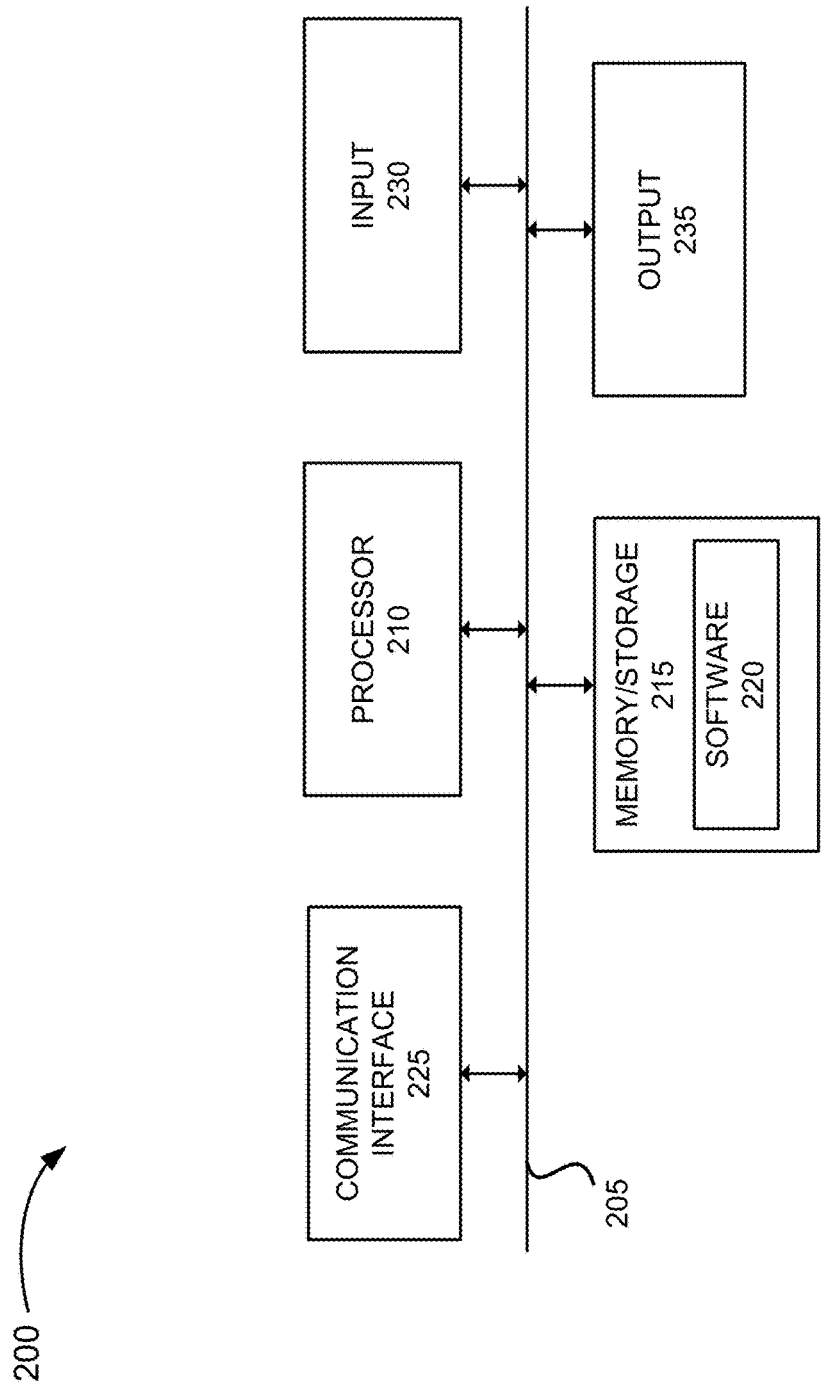
FIG. 2 is a diagram illustrating exemplary components of a device that may correspond to one or more of the devices depicted in the exemplary environments.

The following detailed description refers to the accompanying drawings. The same reference numbers in different drawings may identify the same or similar elements. Also, the following detailed description does not limit the invention.

In the ubiquitous environments of today, wireless devices transmit data to other wireless devices via a wireless medium. In some cases, the data received is free from errors or when there are errors, the errors can be corrected at the receiving wireless devices. For example, various error correction schemes and signal processing techniques are used. In other cases, the errors cannot be corrected, which results in the transmitting wireless devices having to retransmit the data. For example, when the data is received at a receiving wireless device, a demodulation process is performed. The demodulation process generally includes converting a radio frequency signal into a baseband signal and de-mapping/decoding the signal into binary data. Depending on the modulation scheme used, decoding logic included in the receiver of the receiving wireless device determines the binary data based on signal constellation data corresponding to the modulation scheme. In some cases, the decoding logic is unable to map the signal to symbols of the signal constellation data or the decoded binary data results in a checksum error. The wireless devices may use various mechanisms, such as Automatic Repeat Request (ARQ), Hybrid ARQ (HARM), Selective Repeat ARQ, Go-Back-N ARQ, Stop-and-wait ARQ, and so forth, to manage the retransmission of data. Unfortunately, as a result of having to retransmit the data, the expenditure of resources is increased.

According to an exemplary embodiment, a correction service that corrects errors pertaining to wireless communications based on machine learning logic is provided. For example, when an error is present pertaining to data received at the receiving wireless device, the wireless signal (i.e., data) may be retransmitted once or multiple times until the wireless signal is correctly received and decoded without error at the receiving wireless device. According to an exemplary embodiment, the machine learning logic compares the correct data to one or multiple instances of erroneous data. The machine learning logic may generate error vector magnitude (EVM) data based on a result of the comparison in relation to the signal constellation data. Additionally, the machine learning logic may obtain channel information that pertains to the wireless conditions when the initial transmission of the data occurred, when the retransmission of the data occurred, and when the transmission of data was received and decoded without error. According to an exemplary implementation, the channel information includes a signal-to-interface-plus-noise ratio (SINR), a received signal strength indicator (RSSI), a channel quality indicator (CQI), a phase error, and the like. The machine learning logic may also obtain other types of data that may be generated and/or used during a demodulation process, such as error checksum data and portions of the data (e.g., Fast Fourier Transform (FFT) frames or the like) which may or may not include an error. The machine learning logic may store this data (e.g., EVM data, channel information, error checksum data, etc.) in a data structure or a database.

According to an exemplary embodiment, the machine learning logic analyzes the stored data to generate a corrective signal constellation matrix. For example, the machine learning logic modifies the symbol placement in the constellation diagram based on the analysis of the data. The corrective signal constellation matrix is stored in the data structure or the database. As time progresses (e.g., during a session between two devices), the machine learning algorithm may store multiple corrective signal constellation matrices corresponding to different channel conditions and update the corrective signal constellation matrices or portions thereof. The decoding logic uses these corrective signal constellation matrices to correct errors. In this way, the correction service may "learn" the interference patterns and compensate for errors that may be caused by various conditions, such as multipath fading, Doppler effect, interference, etc. As a result, the number of packet retransmissions may be minimized and the effective throughput and overall spectral efficiency may be increased.

FIGS. 1A-1D are diagram illustrating exemplary environments in which exemplary embodiments of the correction service may be implemented. That is, exemplary environment 100 of FIG. 1A, exemplary environment 125 of FIG. 1B, exemplary environment 140 of FIG. 1C, and exemplary environment 150 of FIG. 1D, are examples of different wireless environments within which devices can communicate wirelessly and the correction service may be implemented.

Referring to FIG. 1A, as illustrated, environment 100 includes a wireless device 105, a user 110, and a wireless station 115. Wireless device 105 includes a device having wireless communication capabilities. For example, wireless device 105 may be implemented as a mobile device, a portable device, or a stationary device. By way of further example, wireless device 105 may be implemented as a smartphone, a tablet, a phablet, a netbook, a computer (e.g., a laptop, a palmtop, etc.), a personal digital assistant, a vehicular communication system within a vehicle, or a wearable device (e.g., a watch, glasses, armband, etc.). Alternatively, wireless device 105 may be implemented as a kiosk, a point of sale terminal, a vending machine, a set top box, a smart television, a type of machine-to-machine (M2M) device (e.g., a meter device, a smart device, a security device, etc.), or any other type of device that can wirelessly receive data. According to an exemplary embodiment, wireless device 105 includes the correction service.

Wireless device 105 includes one or multiple wireless communication interfaces. For example, the wireless communication interface includes a radio interface. The radio interface may be implemented according to various wireless standards, such as 2G, 3G, 4G, etc. By way of further example, the wireless communication interface may operate according to Long Term Evolution (LTE), LTE-Advanced (LTE-A), WiFi, Universal Mobile Telecommunications System (UMTS), Global System for Mobile Communications (GSM), Wideband Code Division Multiple Access (WCDMA), Ultra Mobile Broadband (UMB), High-Speed Packet Access (HSPA), Evolution Data Optimized (EV-DO), Worldwide Interoperability for Microwave Access (WiMAX), and/or another type of wireless standard (e.g., a future generation wireless standard, Bluetooth, IEEE 802.xx, etc.).

User 110 is an operator of wireless device 105. Depending on the type of wireless device, user 110 may or may not exist. Wireless station 115 includes a device having wireless communication capabilities. For example, wireless station 115 may be implemented as a network-side device. By way of further example, wireless station 115 may be implemented as a base station, a femto device, a pico device, a relay node, a wireless router, or other type of device that provides wireless access to a network relative to an end device (e.g., wireless device 105). According to an exemplary embodiment, wireless station 115 includes the correction service. Additionally, wireless station 115 includes one or multiple wireless communication interfaces.

Referring to FIG. 1B, environment 125 includes wireless devices 105-1 and 105-2 (also referred to collectively as wireless devices 105 and, generically or individually as wireless device 105), and users 110-1 and 110-2 (also referred to collectively as users 110). According to one exemplary implementation, environment 125 is an environment in which users 110 may directly (or indirectly) communicate wirelessly via wireless devices 105. Alternatively, according to other implementations, environment 125 may omit one or both of users 110. For example, according to a wireless M2M communication, both users 110 may be omitted, or user 110 may communicate via wireless device 105 to another wireless device 105, which is not operated by another user 110.

Referring to FIG. 1C, environment 140 includes network devices 145-1 and 145-2 (also referred to collectively as network devices 145 and, generically or individually as network device 145). Environment 140 is an exemplary environment in which network devices of a wireless network may directly (or indirectly) communicate wirelessly. Network device 145 includes a network device having wireless communication capabilities. For example, network device 145 may be implemented as various types of network devices, such as a server, a gateway, a router, a hub, a firewall, a base station, and so forth. According to an exemplary embodiment, network device 145 includes the correction service. Additionally, network device 145 includes one or multiple wireless communication interfaces.

Referring to FIG. 1D, environment 150 includes wireless device 105, user 110, a radio remote unit (RRU) 155, and a baseband unit (BBU) 160. Environment 140 is an exemplary environment in which radio interface functionality and baseband functionality are separated into different devices. However, these separate devices may cooperatively operate to wirelessly transmit and receive data. RRU 155 and BBU 160 is an exemplary architecture according to LTE-A technologies. According to an exemplary embodiment, BBU 160 includes the correction service. RRU 155 includes one or multiple wireless communication interfaces. RRU 155 and BBU 160 may communicate via an optical fiber 162. Depending on the implementation, BBU 160 may include one or multiple wireless communication interfaces to enable communication to core network elements, other network devices of the LTE-A architecture, and/or other types of backend network devices (e.g., servers, etc.).

FIG. 2 is a diagram illustrating exemplary components of a device 200. Device 200 may correspond to the devices (e.g., wireless device 105, wireless station 105, network device 145, etc.) included in the environments described herein. As illustrated in FIG. 2, according to an exemplary embodiment, device 200 includes a bus 205, processor 210, memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc.

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include drives for reading from and writing to the storage medium.

Memory/storage 215 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 215 may store data, software, and/or instructions related to the operation of device 200.

Software 220 includes an application or a program that provides a function and/or a process. Software 220 is also intended to include firmware, middleware, microcode, hardware description language (HDL), and/or other form of instruction. By way of example, device 200 may include software 220, which when executed, performs one or more functions of the correction service, as described herein.

Communication interface 225 permits device 200 to communicate with other devices, networks, systems, devices, and/or the like. Communication interface 225 includes one or multiple wireless interfaces. For example, communication interface 225 may include one or multiple transmitters and receivers, or transceivers. Communication interface 225 includes an antenna. Communication interface 225 may also include one or multiple wired interfaces. Communication interface 225 may operate according to a protocol stack and a communication standard. Communication interface 225 may include various processing logic or circuitry (e.g., multiplexing/de-multiplexing, filtering, amplifying, converting, modulating, de-modulating, error correction, etc.). According to an exemplary embodiment, communication interface 225 includes a wireless interface that provides the correction service. Communication interface 225 is described further below.

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process and/or a function, as described herein, based on the execution of hardware (processor 210, etc.).

Figure 3A:
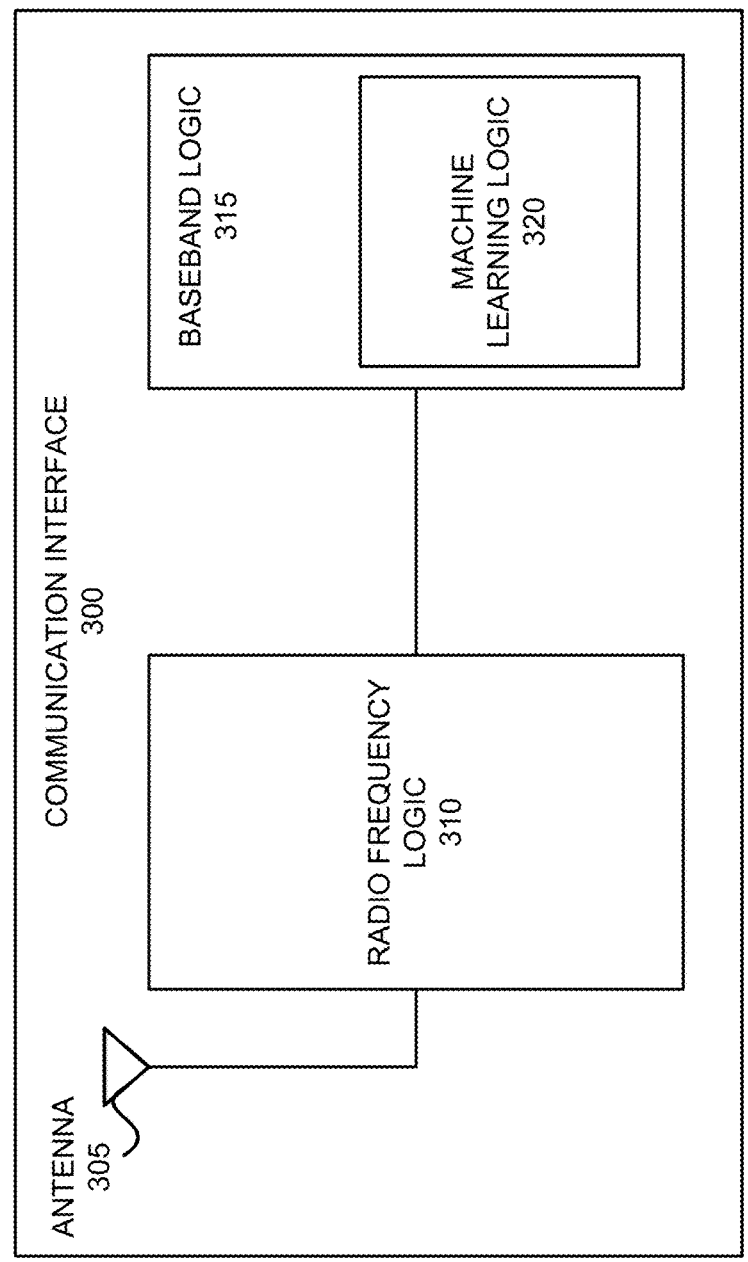
FIG. 3A is a diagram of an exemplary communication interface of a device that provides the correction service.

FIG. 3A is a diagram of an exemplary wireless communication interface 300 of a device that provides the correction service. As previously described, devices of environments 100, 125, 140, and 150 include wireless communication interface 300 that includes the correction service. With reference to FIG. 2, communication interface 225 may include wireless communication interface 300. Referring to FIG. 3A, a communication interface 300 includes an antenna 305, radio frequency logic 310, and baseband logic 315. Baseband logic 315 includes machine learning logic 320.

Antenna 305 includes one or multiple antennas capable of wirelessly receiving data and wireless transmitting data. Antenna 305 may be configured in correspondence to various architectures (e.g., single input single output (SISO), single input multiple output (SIMO) (e.g., switched diversity SIMO, maximum ratio combining SIMO), multiple input single output (MISO), or multiple input multiple output (MIMO)). Antenna 305 may also be configured according to various designs and parameters pertaining to angle spread, port correlation, antenna spacing, vertical/horizontal configurations, etc., as well as other aspects of wireless transmission and reception of data (e.g., beamforming, transmit diversity, etc.).

Radio frequency logic 310 includes logic to transmit and receive wireless signals. For example, radio frequency logic 310 includes radio circuitry that couples to antenna 305 to receive a radio frequency signal from antenna 305 and radio circuitry that couples to antenna 305 to transmit a radio frequency signal to antenna 305. By way of example, the radio circuitry may include various elements, such as an oscillator, a filter, an amplifier, a converter (e.g., analog-to-digital, digital-to-analog), a clock, transmitter circuitry, receiver circuitry, an interface to/from baseband logic 315, a buffer, and so forth.

Baseband logic 315 includes logic to receive, transmit, and process signals to and from radio frequency logic 310. For example, baseband logic 315 includes baseband receiving circuitry and baseband transmission circuitry. The baseband receiving circuitry may be configured to receive baseband signals, process the baseband signals, and output information. The baseband transmission circuitry may be configured to generate and process baseband signals representing information of a data source. For example, the baseband signals may be digital signals (e.g., representing binary data). By way of example, baseband logic 315 may include various elements, such as a modem, an encoder/decoder, a clock, memory, an interface to/from radio frequency logic 310, and so forth.

Machine learning logic 320 includes logic that provides the correction service. According to an exemplary embodiment, machine learning logic 320 includes an instance-based machine learning algorithm. For example, the instance-based learning algorithm may be implemented based on a k-nearest neighbors (k-NN) algorithm, a learning vector quantization (LVQ) algorithm, a self-organizing map (SOM) algorithm, or a locally weighted learning algorithm. Machine learning logic 320 generates a corrective signal constellation matrix. The corrective signal constellation matrix includes a modification of symbol placements in the constellation data, relative to a default signal constellation matrix and symbol placements included therein, based on the analysis of the data. According to an exemplary embodiment, the corrective signal constellation matrix is mapped to or correlates with channel information. For example, machine learning logic 320 may generate, store, and update multiple corrective signal constellation matrices corresponding to different channel conditions. According to such an embodiment, de-mapper 356 may select a corrective signal constellation matrix from multiple corrective signal constellation matrices based on a (best) matching between the current channel condition and channel information that is mapped to the corrective signal constellation matrix.

According to other exemplary embodiments, the corrective signal constellation matrix is not mapped to or is not correlated to channel information. For example, a de-mapper may use the corrective signal constellation matrix as a default signal constellation matrix regardless of the current channel condition. According to an exemplary embodiment, machine learning logic 320 uses channel information, EVM data, error checksum data, and the received data to generate and update a corrective signal constellation matrix. Machine learning logic 320 is described further below.

According to yet other exemplary embodiments, the de-mapper may switch between a default signal constellation matrix and a corrective signal constellation matrix based on the number of retransmissions occurring with respect to one or multiple segments of data. For example, a counter mechanism may be used to count the number of retransmissions occurring and compare the number to a threshold value. When the threshold value is met, the de-mapper uses the corrective signal constellation matrix. The de-mapper may switch back to the default signal constellation matrix or another corrective signal constellation matrix when the number of retransmissions again satisfies the threshold value.

Figure 3B:
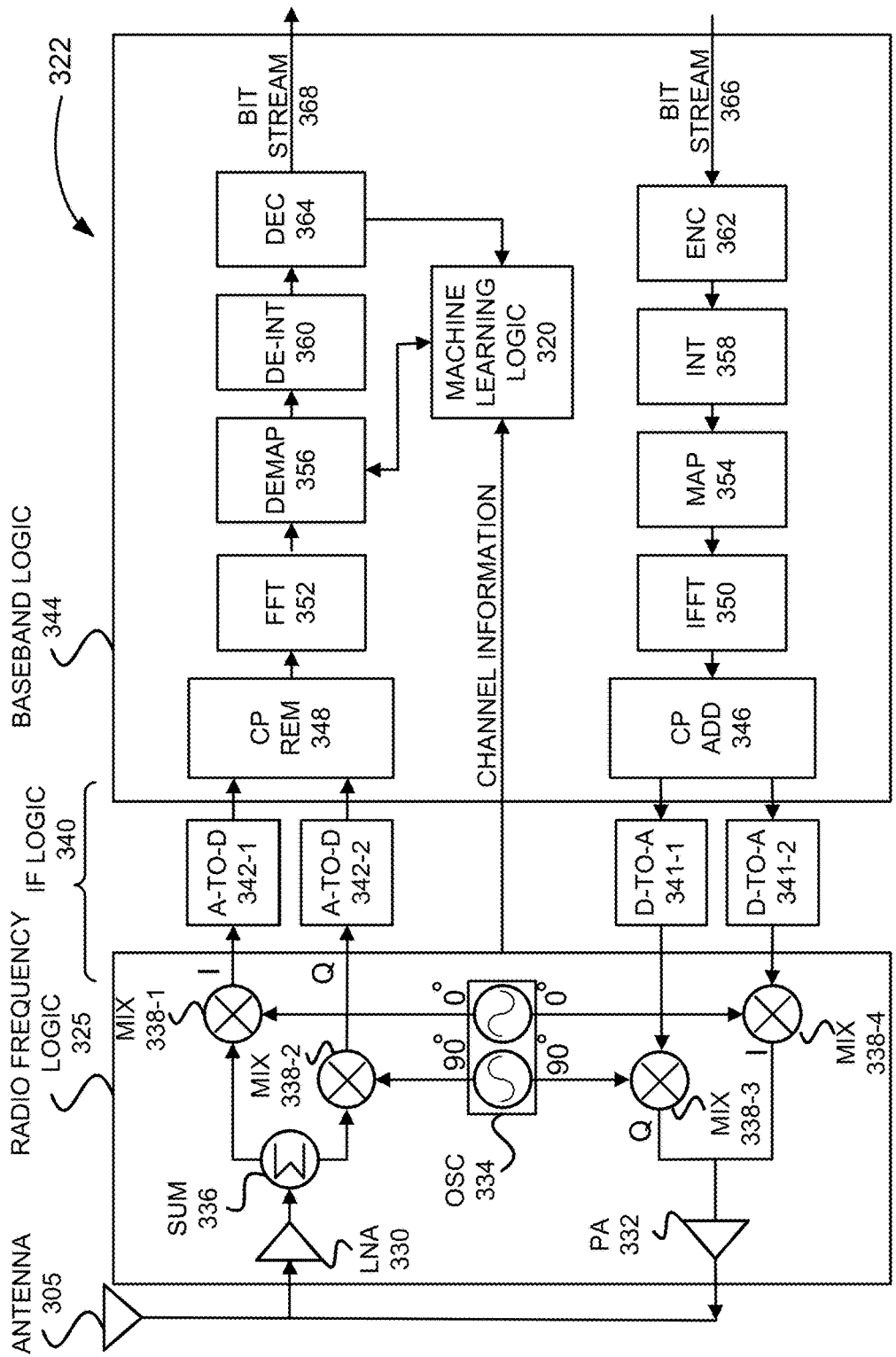
FIG. 3B is a diagram of another exemplary communication interface of a device that provides the correction service.

FIG. 3B is a diagram of another exemplary wireless communication interface of a device that provides the correction service. For example, a communication interface 322 illustrated in FIG. 3B is an exemplary implementation of an embodiment of communication interface 300 illustrated in FIG. 3A. According to this example, communication interface 322 is an Orthogonal Frequency Division Multiple Access (OFDMA) transmitter and receiver that include correction service functionality.

Referring to FIG. 3B, communication interface 322 includes antenna 305, radio frequency logic 325, intermediate frequency (IF) logic 340, and baseband logic 344. As illustrated, radio frequency logic 325 includes a low noise amplifier (LNA) 330, a power amplifier (PA) 332, an oscillator 334, a summing circuit 336, and mixers 338-1 through 338-4. IF logic 340 includes digital-to-analog (D-to-A) converters 341-1 and 341-2 and analog-to-digital (A-to-D) converters 342-1 and 342-2. Although not illustrated, IF logic 340 may include an oscillator for up-conversion and down-conversion of the signals in the I and Q paths.

Baseband logic 344 includes a cyclic prefix adder 346, a cyclic prefix remover 348, an inverse FFT (IFFT) module 350, an FFT module 352, machine learning logic 320, a mapper 354, a de-mapper 356, an interleaver 358, a de-interleaver 360, an encoder 362, and a decoder 364.

According to other exemplary implementations, communication interface 322 may include additional elements, fewer elements, and/or different elements than those illustrated in FIG. 3B. For example, communication interface 322 may include an Additive White Gaussian Noise (AWGN) element (e.g., to add AWGN), a scrambler/de-scrambler (e.g., to randomize/de-randomize bit sequences), a MIMO parser, a MIMO detection unit, a guard inserter/remover (e.g., to preserve orthogonality of the sub-carriers and the independence of subsequent OFDM symbols), a pilot inserter/remover (e.g., to prevent inter-carrier interference (ICI)), a parallel-to-serial (P/S) module, a serial-to-parallel (S/P) module, and/or a channel estimator. Additionally, or alternatively, in the context of RRU 155 and BBU 160, the elements of radio frequency logic 325, IF logic 340, and baseband logic 344 may reside in RRU 155 and BBU 160 in various configurations, as described further below. For example, RRU 155 may include radio frequency logic 325, IF logic 340, and a portion of baseband logic 344 (e.g., cyclic prefix adder 346, cyclic prefix remover 348, inverse FFT (IFFT) module 350, and FFT module 352), while BBU 160 includes a remaining portion of baseband logic 344 (e.g., machine learning logic 320, mapper 354, de-mapper 356, interleaver 358, de-interleaver 360, encoder 362 and decoder 364).

Additionally, or alternatively, according to other exemplary implementations, communication interface 322 may include a single carrier frequency division multiple access (SC-FDMA) transceiver, a code division multiple access (CDMA) transceiver, a time division multiple access (TDMA) transceiver, or other well-known or conventional multiplexing or multiple access technology.

The elements of radio frequency logic 325 and IF logic 340 may operate according to conventional methods and a further description of these elements and the operation thereof have been omitted. Referring to baseband logic 344, at the transmitter side, encoder 362 receives a bit stream 366. Encoder 362 includes logic that may encode the bits as a part of a forward error correction scheme. For example, encoder 362 may encode the bits (e.g., with parity) based on a Reed Solomon (RS) encoding scheme. Additionally, for example, encoder 362 may encode the bits (e.g., adding redundant bits) based on a convolution encoding scheme. Interleaver 358 includes logic that may interleave the bits to protect the data from burst errors during transmission. For example, interleaver 358 may aggregate the bits into blocks and the bits within each block may be rearranged. Mapper 354 includes logic that may map the interleaved bits onto different sub-carrier signals. For example, mapper 354 may use various constellations pertaining to various modulation schemes (e.g., Quadrature Amplitude Modulation (QAM) (e.g., 16-QAM, 64-QAM, 128-QAM, etc.), Quadrature Phase Shift Keying (QPSK), Binary Phase Shift Key (BPSK), and so forth) to map the interleaved bits to OFDM symbols (e.g., QAM symbols, etc.) and output a modulated signal. IFFT 350 includes logic that may perform an IFFT process. For example, IFFT 350 includes logic that may transform the spectrum (e.g., amplitude and phase of each component) into a time domain signal. Cyclic prefix adder 346 includes logic that may add a cyclic prefix to the signal. For example, the cyclic prefix may provide circular convolution between the transmitted signal and a channel impulse response.

Referring to the receiver side of baseband logic 344, cyclic prefix remover 348 includes logic that may remove the cyclic prefix. FFT 352 includes logic that may perform the reverse task of IFFT 350. For example, FFT 352 includes logic to convert the time domain signal into the frequency domain (e.g., phase and amplitude components). De-mapper 356 includes logic that may perform the reverse task of mapper 354. For example, de-mapper 356 includes logic that may de-map or recover the bits from the symbols based on a signal constellation matrix. For example, QAM symbol data includes the amplitude and phase of a received QAM symbol during a particular QAM symbol period. De-mapper 356 de-maps the QAM symbols to a QAM constellation and decodes the symbols to corresponding bits. De-interleaver 360 includes logic that may de-interleave the bits. Decoder 364 includes logic that may decode the bits. For example, decoder 364 includes logic that may decode the bits based on an RS decoder. Additionally, for example, decoder 364 includes logic that may decode the convolution encoding. For example, decoder 364 includes logic that may decode the convolution encoding based on a Viterbi decoding algorithm.

Figures 4D, 4E:
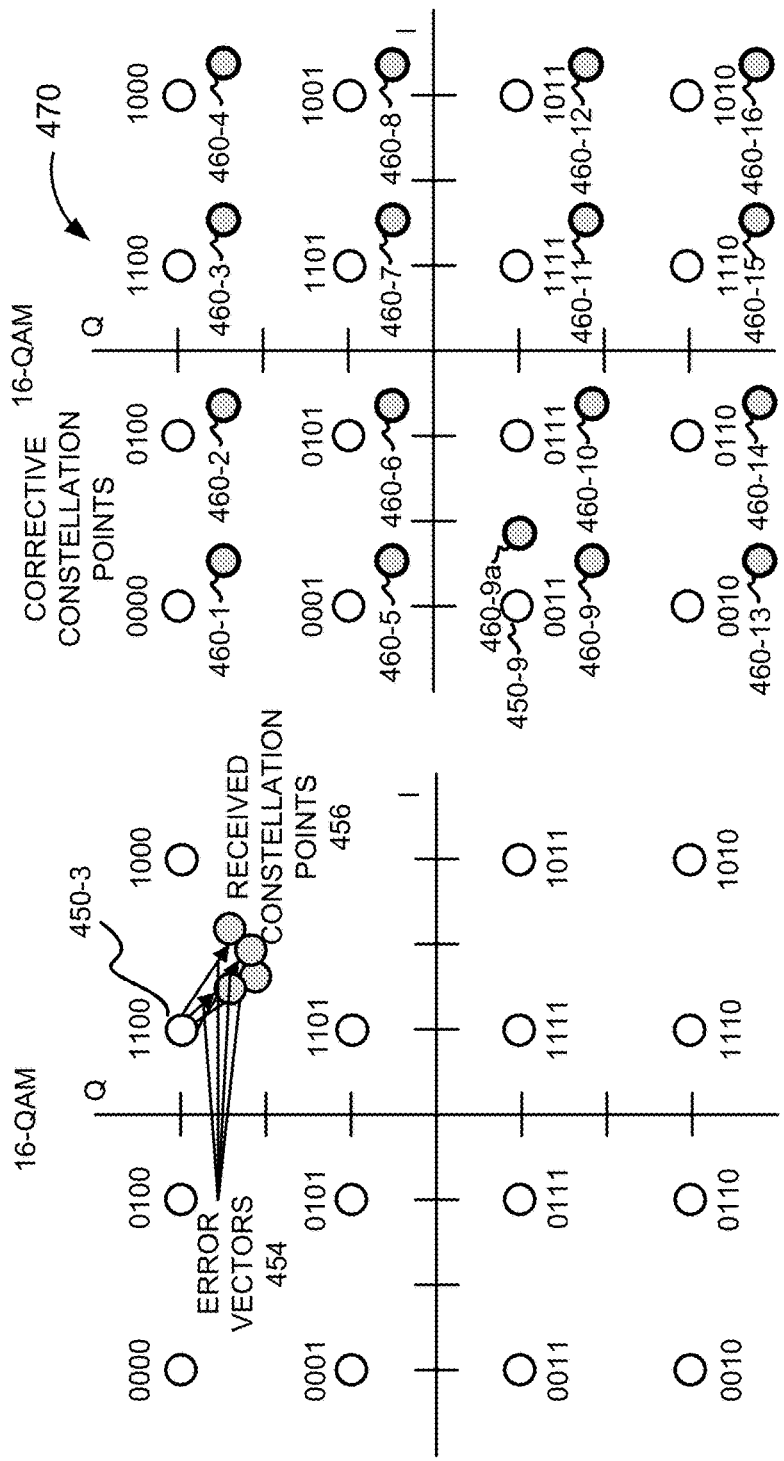
Figure 4F:
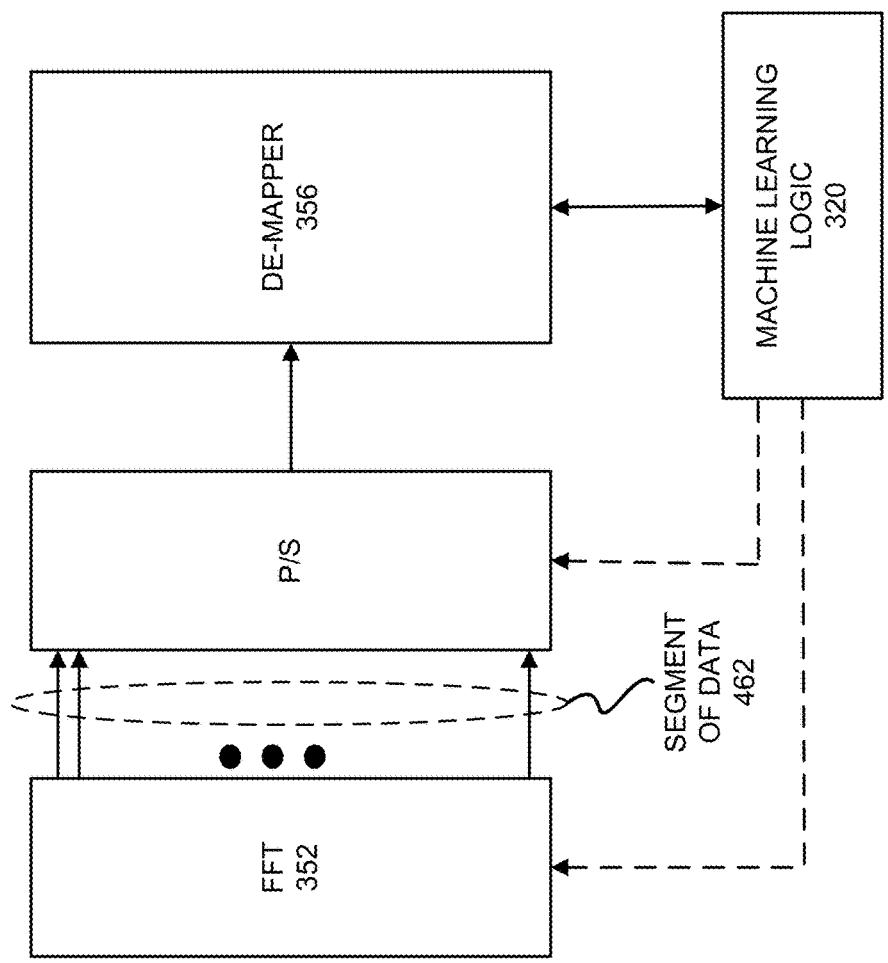

As illustrated, according to an exemplary implementation, machine learning logic 320 is connected to de-mapper 356 and decoder 364. According to an exemplary embodiment, machine learning logic 320 obtains constellation point data indicating points of a constellation diagram. For example, when M-QAM modulation/de-modulation is used, in which M represents the total number of constellation points, the constellation point data includes complex values (e.g., real and imaginary) representative of QAM symbols in the I-Q plane. Typically, a P/S module is used between FFT 352 and de-mapper 356, in which case, de-mapper 356 may obtain a serially array of QAM symbols belonging to a particular FFT frame or block output by FFT 352 to de-mapper 356 via the P/S module. The output of FFT 352 depends on the FFT size (e.g., 128, 512, 1024, etc.) of FFT 352. Machine learning logic 320 stores the QAM symbols in a data structure or a database. According to other implementations, machine learning logic 320 may obtain the constellation point data from FFT 352 or a P/S module, as illustrated in FIG. 4F.

As further illustrated, machine learning logic 320 obtains channel information. For example, machine learning logic 320 may obtain the SINR, the RSSI, the CQI, etc., from radio frequency logic 325 or other components of device 200. The channel information may indicate the channel conditions during which the symbols were transmitted or received at device 200. Typically, channel conditions vary or change at a relatively low rate (e.g., around 10 Hertz or below). According to an exemplary embodiment, machine learning logic 320 stores the channel information applicable to the constellation point data in the data structure or the database.

As described above, the constellation point data is processed by de-mapper 356, de-interleaver 360, and decoder 364 to recover the bits. In some cases, the bits are recovered without error. According to an exemplary embodiment, decoder 364 indicates to machine learning logic 320 that the segment of bits did not contain errors. Machine learning logic 320 may delete the QAM symbols data for the error-free segments. However, in other cases, the bits contain errors that cannot be corrected. In such cases, receiving device 200 may request a retransmission. According to an exemplary embodiment, decoder 364 indicates to machine learning logic 320 that the segment of bits contained errors that cannot be corrected. Decoder 364 may also provide the segment of data (i.e., the segment of bits) that includes the error bits to machine learning logic 320. Machine learning logic 320 may store the segment of data that includes the error bits in the data structure or the database.

As one or multiple retransmissions occur pertaining to this segment of data, the process described above may correspondingly repeat until the bits are recovered free from error. Decoder 364 may provide the segment of data that includes the bits that have been correctly received and decoded. Machine learning logic 320 may identify retransmissions at least at a packet level based on higher layer functionality associated with the retransmission scheme used.

According to an exemplary embodiment, machine learning logic 320 calculates EVM data pertaining to the constellation point data associated with the segment of data that included an error and the segment of data that did not include the error. For example, machine learning logic 320 may calculate an error vector based on the constellation point data that includes error and the constellation point data that does not include error and is correctly decoded.

According to an exemplary embodiment, machine learning logic 320 generates a corrective signal constellation matrix based on the data stored. For example, machine learning logic 320 may calculate an error vector (or an average error vector when multiple instances of constellation point data exists pertaining to a same symbol that was incorrectly decoded with error) for each symbol that was in error. Based on these calculations, machine learning logic 320 generates the corrective signal constellation matrix that shifts the corresponding constellation points of an existing constellation (e.g., a default constellation) to new places on the I-Q plane. The corrective signal constellation matrix may be subsequently used by de-mapper 356 when performing its de-mapping function.

As described herein, according to an exemplary embodiment, machine learning logic 320 stores various types of data (referred to as "corrective service data) as a basis to generate the corrective signal constellation matrix. The corrective service data may be stored in a data structure or a database of which an example is described below.

FIG. 4A is a diagram illustrating an exemplary table that stores exemplary corrective service data. As illustrated, a table 400 includes a channel information field 405, a constellation point data field 410, an EVM field 415, an error bits field 420, a correct bits field 425, and a corrective signal constellation matrix field 430. According to other implementations, table 400 may include additional instances of data, fewer instances of data, and/or different types of data. Table 400 may include profiles 440-1 through 440-Z (also referred to collectively as profiles 440 and, individually or generically as profile 440). Each profile 440 pertains to a different channel condition, as described herein.

Channel information field 405 stores channel information. For example, the channel information may include an SINR, an RSSI, a CQI, a phase error, and/or the like. The values pertaining to a channel parameter may be a single number, multiple numbers, or a range of numbers. Channel information field 405 may store channel information pertaining to multiple transmissions of data. Since channel conditions change over time, channel information field 405 may store channel information indicative of channel conditions occurring over multiple periods of time during a transmission and one or multiple retransmissions occurred.

Constellation point data field 410 stores constellation point values. The constellation point values may include complex values (e.g., real and imaginary numbers) indicating points on an I-Q plane. For example, an instance of a constellation point may have a value of −3j-3 to represent bits 0000. The constellation point values stored in constellation point data field 410 may correspond to correctly received symbols and incorrectly received symbols. By way of further example, referring to FIG. 4B, an exemplary 16-QAM constellation diagram 445 is illustrated. As illustrated, in a rectangular I-Q plane in which I represents the amplitude of the in-phase signal and Q represents the amplitude of the quadrature signal, constellation points 450-1 through 450-16 (referred to collectively as constellation points 450 and, generically or individually as constellation point 450) are arranged in the I-Q plane that correspond to QAM symbols and bit patterns. While constellation points 450 are illustrated as circles of a particular size, in practice each constellation point 450 may occupy a larger area and be of a different shape in the I-Q plane. Additionally, according to other implementations, the I-Q plane may be of a non-rectangular configuration.

Referring back to FIG. 4A, EVM field 415 stores EVM values representative of error vectors between ideal or reference constellation points and received constellation points. For example, referring to FIG. 4C, an error vector 453 may be calculated based on a difference between an ideal vector 451 directed to an ideal constellation point 450-3 and a vector 452 directed to a received constellation point 455. Machine learning logic 320 calculates and stores an EVM value representative of error vector 453.

Over time, as errors occur at the receiver-side of communication interface 225, EVM values may be calculated pertaining to constellation points 450. For example, as illustrated in FIG. 4D, error vectors 454 may be calculated based on received constellation points 456 and ideal constellation point 450-3. Ideal constellation point 450-3 may be identified relative to the received constellation points 456 after one or multiple retransmissions occur that results in the data being correctly received at communication interface 225.

Returning to FIG. 4A, error bits field 420 stores a segment of bits that include bits that are incorrect in value. For example, the segment of bits corresponds to bits included in an initial transmission that had bit errors and any subsequent retransmission that had bit errors. Correct bits field 425 stores a segment of bits in which all the bits are correct in value. Machine learning logic 320 may use the segments of bits stored in error bits field 420 and correct bits field 425 for comparison. Based on the result of the comparison, machine learning logic 320 can determine which series of bits are correct and which are in error. Additionally, machine learning logic 320 may correlate the correct bits and the error bits to the constellation point data stored in constellation point data field 410. For example, referring to FIG. 4F, FFT 352 may output a segment of data 462 according to its FFT size configuration to de-mapper 356 via a P/S module. Referring to FIG. 4G, machine learning logic 320 may obtain and store constellation point data with error 465. Subsequently, after decoding by decoder 364 and detection of uncorrectable bit errors, machine learning logic 320 may obtain and store bits with error 467. Thereafter, device 200 receives a retransmission of a packet that included segment of data 462. The retransmission is received and decoded without error. Machine learning logic 320 obtains and stores constellation point data without error 466 and bits without error 468. Based on these segments of data, machine learning logic 320 is able to correlate each instance of constellation point data and bit data. Machine learning logic 320 can calculate EVM values and corrective constellation point data based on the correlation.

Referring back to FIG. 4A, corrective signal constellation matrix field 430 stores corrective signal constellation matrices that include repositioned ideal or reference constellation points on the I-Q plane corresponding to symbols and binary data. FIG. 4E is a diagram illustrating an exemplary corrective signal constellation diagram. As illustrated, a corrective signal constellation diagram 470 includes corrective constellation points 460-1 through 460-16 (also referred to collectively as corrective constellation points 460 and, generically or individually as corrective constellation point 460).

Machine learning logic 320 calculates a position for each corrective constellation point 460 based on the corrective service data stored in table 400. For example, an instance-based machine learning algorithm of machine learning logic 320 uses the EVM data and the channel information to identify a pattern of error, which is characteristic of the channel information and contributory to the EVM data, as a basis to estimate correction factors relative to the constellation points of the currently used signal constellation diagram. For example, based on the estimations, constellation points 450 have been re-positioned to the positions of corrective constellation points 460 on the I-Q plane.

Although, in FIG. 4E, corrective signal constellation diagram 470 illustrates that each constellation point 450 is repositioned in a similar manner to other constellation points 450 (i.e., all of corrective constellation points 460 are down and to the right relative to constellation points 450), such positioning is for illustrative purposes only. The repositioning of constellation points 450 may result in corrective signal constellation diagram 470 including corrective constellation points 460 being repositioned on the I-Q plane in a non-uniform manner. For example, with respect to constellation point 450-9, the corrective constellation point could be positioned at corrective constellation point 460-9a. In this regard, one or multiple constellation points 450 may be repositioned in a different manner on the I-Q plane relative to one or multiple other constellation points 450.

According to various implementations, machine learning logic 320 may reposition constellation points 450 on an individual basis or on a group basis (e.g., a quadrant basis (i.e., one quarter of the diagram), a half-a-diagram basis, etc.). Additionally, corrective signal constellation diagram 470 may include one or more constellation points 450 that have not been repositioned.

As previously described, according to an exemplary embodiment, machine learning logic 320 calculates a corrective signal constellation matrix. The corrective signal constellation matrix is mapped to a channel condition. For example, machine learning logic 320 may calculate multiple corrective signal constellation matrices that are mapped to multiple and distinct channel conditions, as reported or retrieved from radio frequency logic 310/325.

According to other embodiments, the corrective signal constellation matrix may be used as a default signal constellation matrix for all channel conditions. Of course, other parameters may be used to map a corrective signal constellation matrix. For example, communication interface 225 may adaptively change the modulation and demodulation scheme used. Consequently, the corrective signal constellation matrix may be mapped to the modulation and demodulation scheme, either individually, or in combination with channel conditions. Additionally, as previously described, machine learning logic 320 may update the corrective signal constellation matrix. For example, machine learning logic 320 may update corrective constellation points based on the corrective service data acquired during reception of data via communication interface 225.

According to an exemplary implementation, the use of the corrective signal constellation matrix may be based on a counter mechanism. For example, communication interface 225 may use a default signal constellation matrix for modulating and demodulating data. After a certain number of unsuccessful retransmissions, communication interface 225 may use a corrective signal constellation matrix. For example, communication interface 225 may compare the number of unsuccessful retransmissions to a threshold value. When the number of unsuccessful retransmissions is equal to or greater than the threshold value, communication interface 225 switches from using the default signal constellation matrix to the corrective signal constellation matrix determined by machine learning logic 320.

Figure 5A:
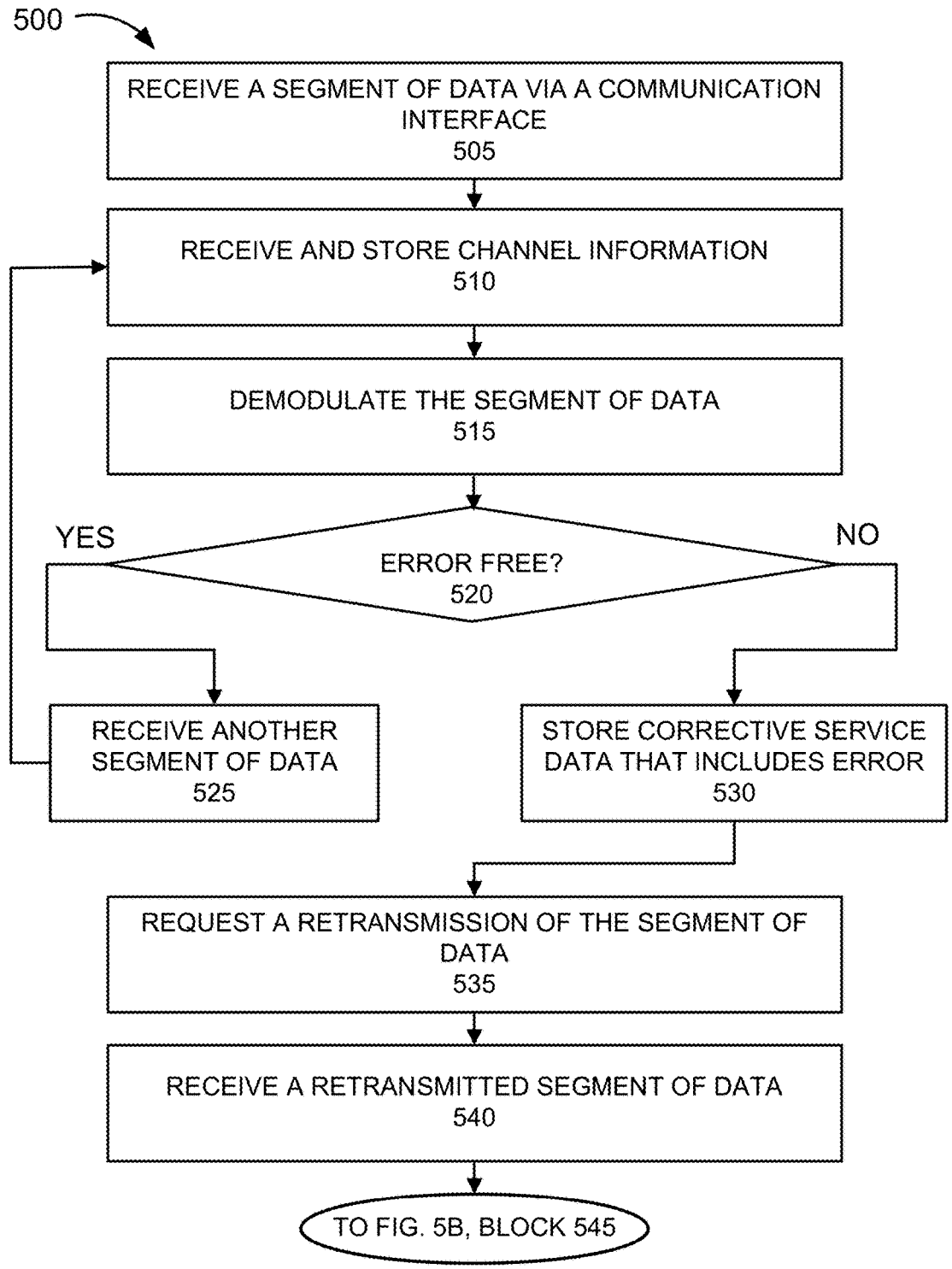
FIGS. 5A-5C are flow diagrams that illustrate an exemplary process pertaining to the correction service.
Figure 5B:
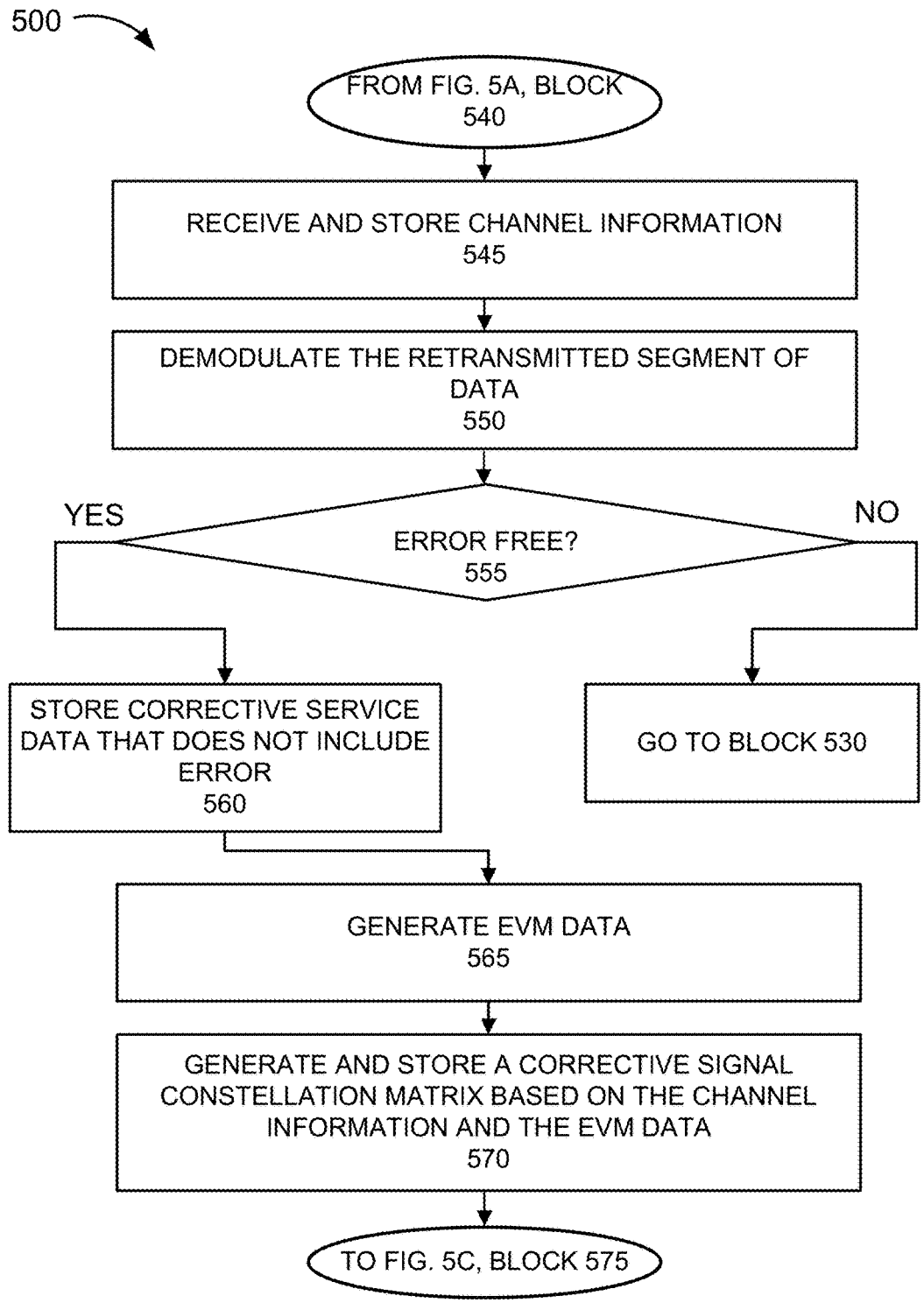
Figure 5C:
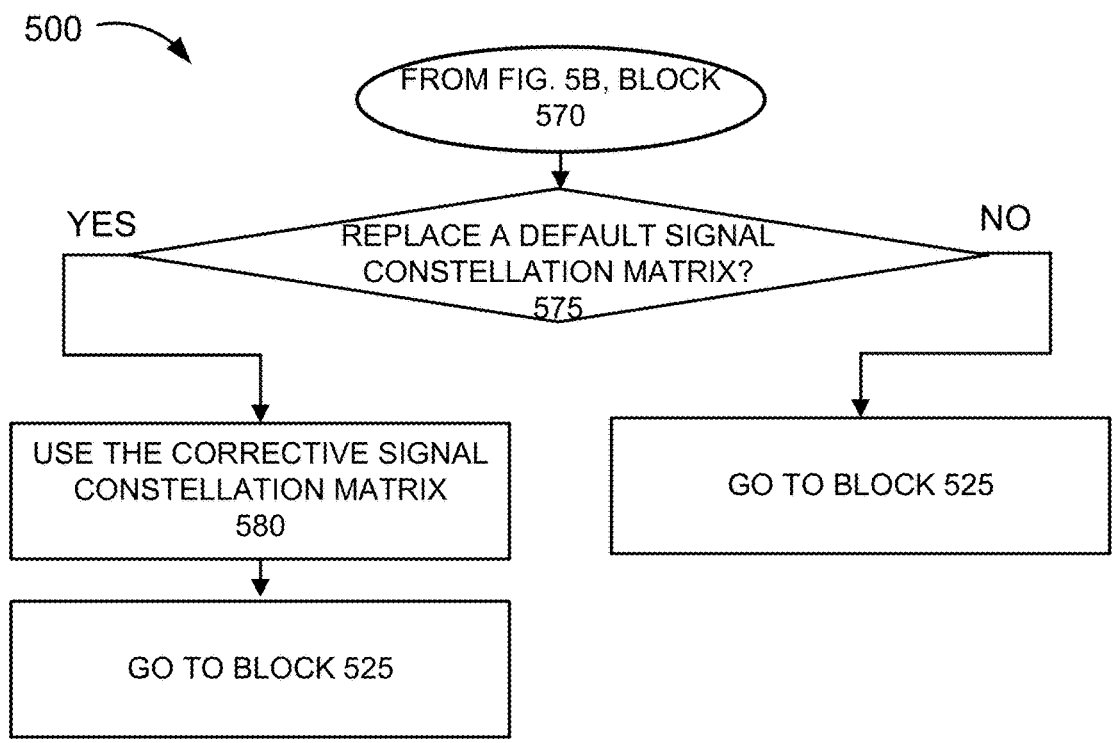

FIGS. 5A-5C are flow diagrams that illustrate an exemplary process 500 pertaining to the correction service. Process 500 is directed to a process previously described above with respect to FIGS. 3A, 3B, and 4A-4G as well as elsewhere in this description, in which a wireless device provides a corrective service that uses machine learning to analyze corrective service data to generate a corrective signal constellation matrix. According to an exemplary embodiment, a wireless device, such as wireless device 105 or network device 145 performs at least some of the steps described in process 500. According to another exemplary embodiment, a non-wireless device (e.g., BBU 160) that is communicatively coupled via a wired connection to a wireless device (e.g., RRU 155) performs at least some of the steps described in process 500. For example, processor 210 may execute software 220 to perform the steps described in process 500. By way of further example, communication interface 225 may include logic that performs some or all of the steps of process 500.

Referring to FIG. 5A, process 500 may begin, in block 505, with a communication interface receiving a segment of data. For example, a transmitting wireless device transmits data to a receiving wireless device. The receiving wireless device receives the data via a wireless communication interface (e.g., communication interface 300, communication interface 322, etc.). The communication interface processes the data based on radio frequency logic (e.g., radio frequency logic 310, radio frequency logic 325, etc.).

In block 510, channel information is received and stored. For example, machine learning logic 320 receives channel information pertaining to the channel conditions via which the segment of data was transmitted. By way of example, the channel information may include SINR, RSSI, CQI, phase error, and the like. In block 515, the segment of data is demodulated. For example, de-mapper 356 receives an output from FFT 352. De-mapper 356 converts the modulated symbols to bits based on a constellation diagram. The constellation diagram may pertain to various modulation and demodulation schemes, as previously described. Machine learning logic 320 may store the constellation point data output by FFT 352. According to various exemplary implementations, machine learning logic 320 obtains the constellation point data from FFT 352, a P/S module, or de-mapper 356.

In block 520, it is determined whether the segment of data is error free. For example, decoder 364 determines whether the segment of data is free from error based on an error detection and correction scheme. When it is determined that the segment of data is error free (block 520—YES), another segment of data is received (block 525). For example, the communication interface may receive or process a subsequent segment of data. Process 500 may continue to block 510.

When it is determined that the segment of data is not error free (block 520-NO), the corrective service data that includes error is stored (block 530). For example, machine learning logic 320 stores the segment of data that includes bits with error. Machine learning logic 320 may map or correlate the error bit data with the other data stored (e.g., the channel information and the constellation point data) for this segment of data.

In block 535, a retransmission of the segment of data is requested. For example, the receiving wireless device may invoke a retransmission scheme in response to determining that the segment of data is not free from error. In block 540, a retransmitted segment of the data is received. For example, the receiving wireless device receives the retransmitted segment of data via the wireless communication interface (e.g., communication interface 300, communication interface 322, etc.). The communication interface processes the retransmitted segment of data based on radio frequency logic (e.g., radio frequency logic 310, radio frequency logic 325, etc.).

Referring to FIG. 5B, in block 545, channel information is received and stored. For example, machine learning logic 320 receives channel information pertaining to the channel conditions via which the retransmitted segment of data was transmitted.

In block 550, the retransmitted segment of data is demodulated. For example, de-mapper 356 receives an output from FFT 352. De-mapper 356 converts the modulated symbols to bits based on a constellation diagram. Machine learning logic 320 may store the constellation point data output by FFT 352. In block 555, it is determined whether the retransmitted segment of data is error free. For example, decoder 364 determines whether the segment of data is free from error based on an error detection and correction scheme.

When it is determined that the retransmitted segment of data is error free (block 555—YES), corrective service data that does not include error is stored (block 560). When it is determined that the retransmitted segment of data is not error free (block 555-NO), process 500 may continue to block 530.

In block 565, EVM data is generated. For example, machine learning logic 320 calculates EVM data based on the corrective service data. The corrective service data may include the constellation point data and/or bit data, as previously described. The EVM data may pertain to one or multiple constellation points of a default signal constellation matrix.

In block 570, a corrective signal constellation matrix based on the corrective service data and the EVM data is generated and stored. For example, machine learning logic 320 generates the corrective signal constellation matrix based on the channel information and the EVM data. For example, the instance-based machine learning algorithm of machine learning logic 320 uses the EVM data and the channel information to identify a pattern of error, which is characteristic of the channel information and contributory to the EVM data, as a basis to estimate correction factors relative to the constellation points of the currently used signal constellation diagram. For example, based on the estimations, machine learning logic 320 determines one or multiple positions for one or multiple constellation points on the I-Q plane. That is, as previously described, the corrective signal constellation matrix includes one or multiple corrective constellation points that is/are repositioned on the I-Q plane relative to one or multiple constellation points of the default signal constellation matrix. Machine learning logic 320 stores the corrective signal constellation matrix.

Referring to FIG. 5C, in block 575, it is determined whether to replace a default signal constellation matrix. For example, machine learning logic 320 may determine whether to replace the default signal constellation matrix 575, which may be currently used by de-mapper 356, with the corrective signal constellation matrix. According to one exemplary implementation, machine learning logic 320 may determine to replace the default signal constellation matrix based on the current channel conditions, based on a counter system (e.g., the number of retransmissions occurring), and/or any other configurable parameter.

When it is determined to replace the default signal constellation matrix (block 575—YES), the corrective signal constellation matrix is used (block 580). For example, de-mapper 356 may use the corrective signal constellation matrix to de-map subsequently received segments of data. Process 500 may continue to block 525. When it is determined to not replace the default signal constellation matrix (block 575-NO), process 500 may continue to block 525.

Although FIGS. 5A-5C illustrate an exemplary process 500, according to other embodiments, process 500 may include additional operations, fewer operations, and/or different operations than those illustrated in FIGS. 5A-5C, and described herein. For example, according to other exemplary embodiments, block 575 of process 500 may be omitted. That is, when the corrective signal constellation matrix is generated, the corrective signal constellation matrix replaces the default signal constellation matrix and is used.

LTE-Advanced (LTE-A) technology is comprised of a number of features intended to improve the performance at the cell edge, which is currently the weakest part of the radio frequency (RF) link. Typically, a neighboring cell is considered interference (e.g., inter-cell interference (ICI)) from the perspective of a serving cell of the user equipment (UE), as the UE moves to a point halfway between the two cells (i.e., a cell edge). The SINR is very low because whichever cell the UE selects as its serving cell, the neighboring cell appears as noise, which may be of a level roughly equivalent to the signal of the serving cell. As a result of these conditions, a large number of packet retransmissions may occur. Consequently, the effective throughput and overall spectral efficiency is reduced.

To overcome this problem, a feature called Coordinated Multipoint Joint Processing (CoMP-JP) has been developed in which a group of devices (e.g., remote radio units (RRUs), remote radio heads (RRHs), radio equipment (RE)) are coordinated in such a way that the RRHs are transmitting and receiving together. In view of this coordinated effort, the cell edge problem may be minimized. However, for the uplink version of this feature to work, a complete time domain copy of the radio wave being received must be uploaded from each of the RRHs to a central device (e.g., a baseband unit (BBU)), where the data may be processed to produce a final output signal. Unfortunately, the uploading of the radio wave signature requires a large amount of bandwidth. For example, dense wavelength division multiplexing (DWDM) and dark fiber (e.g., 1.28 Gbps per Multiple Input Multiple Output (MIMO) stream per band) may be needed to satisfy the bandwidth requirements, which can easily exceed 10 Gbps/antenna.

According to an exemplary embodiment, the correction service uses a CoMP architecture in that a group of wireless stations (e.g., RRUs) receive the signal from a UE in a coordinated manner. In contrast to the CoMP-JP framework, each RRU independently performs IFFT and FFT functions. Thus, the time domain signal from each RRU, at the transmitter side, may require less bandwidth for uploading to the BBU compared to the signal that has yet to be transformed. Similarly, the frequency domain signal from each RRU, at the receiver side, may require less bandwidth for uploading to the BBU compared to the signal that has yet to be transformed. According to an exemplary embodiment, at the receiver-side, the RRU transmits channel information to the BBU 112. According to an exemplary embodiment, the BBU include machine learning logic 320 and provides the correction service.

Figure 6:
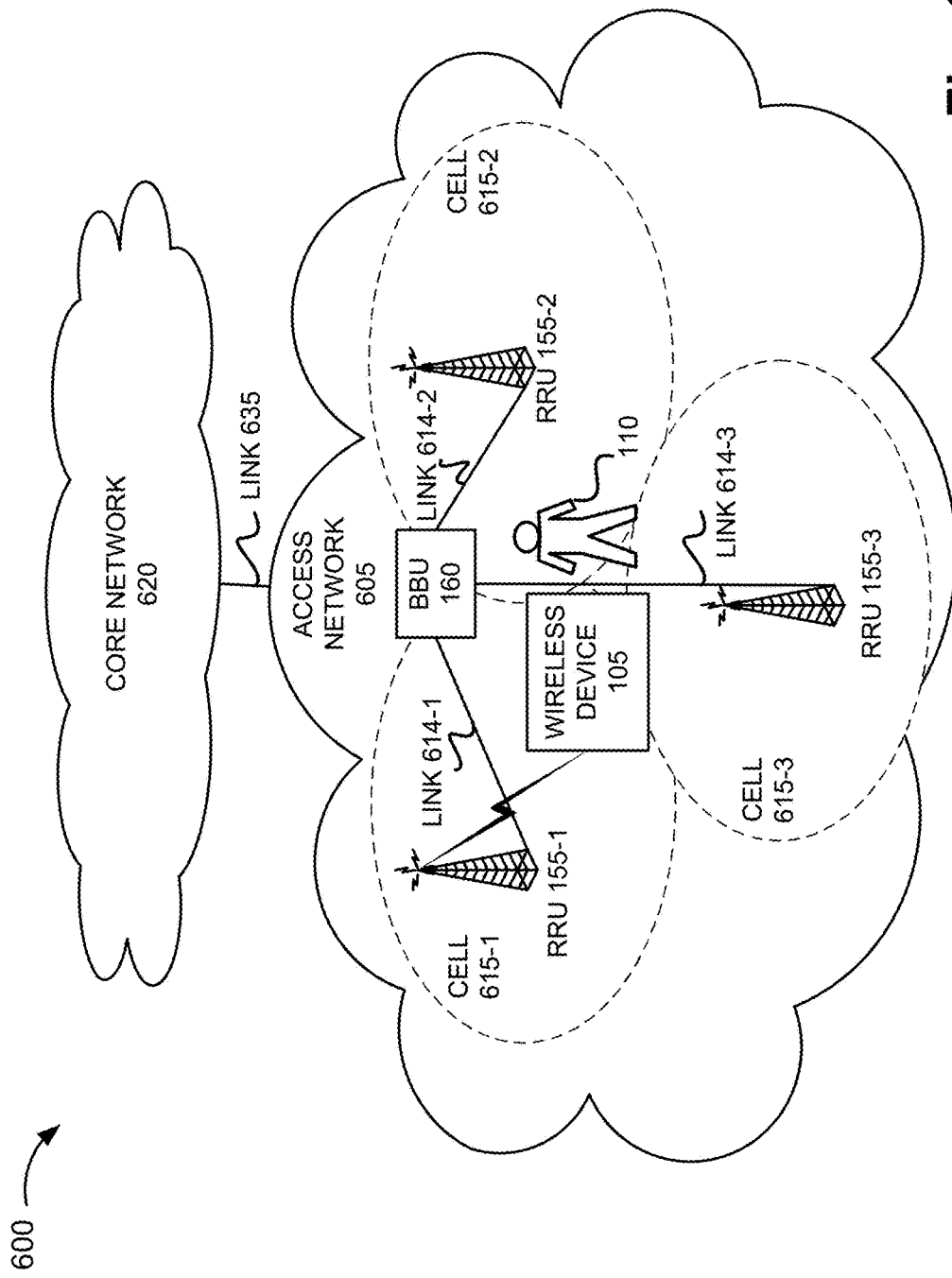
FIG. 6 is a diagram illustrating yet another exemplary environment in which the corrective service may be implemented.

FIG. 6 is a diagram illustrating another exemplary environment in which the corrective service may be implemented. As illustrated, environment 600 includes an access network 605. Access network 605 includes an Evolved UMTS Terrestrial Radio Access Network (E-UTRAN) of an LTE network or an LTE-A network. For example, access network 605 includes remote radio units (RRUs) 155-1, 155-2, and 155-3 (also referred to collectively as RRUs 155 and, generically or individually as RRU 155). As illustrated, RRU 155-1 services a cell 615-1, RRU 155-2 services a cell 615-2, and RRU 155-3 services a cell 615-3. Cells 615-1, 615-2, and 615-3 may also be referred to collectively as cells 615 and, generically or individually as cell 615. Cell 615 indicates a geographic area serviced by RRU 155. The number of RRUs 155 and cells 615 illustrated are exemplary. Additionally, according to other implementations, a single RRU 155 may service more than one cell 615. For example, cell 615 may be defined based on the radio frequency. In this regard, RRU 155 may be provisioned with multiple and different radio frequencies and correspondingly service multiple and different cells 615.

RRU 155 includes logic that generates an analog RF signal from a digital baseband signal and transmits the analog RF signal via its antenna. According to an exemplary implementation, at the transmitter-side, RRU 155 includes logic of an orthogonal frequency domain multiple access (OFDMA) system. RUU 155 also includes logic that generates a digital baseband signal from an analog RF signal received via its antenna. According to an exemplary implementation, at the receiver-side, RRU 155 includes logic of an SC-FDMA system. According to an exemplary implementation, the antenna of RRU 155 includes a MIMO antenna architecture.

According to an exemplary embodiment, RRUs 155 use CoMP joint reception (JR) for the uplink. For example, uplink data transmitted by wireless device 105 and carried by the physical uplink shared channel (PUSCH) or the physical uplink control channel (PUCCH) is received jointly at multiple points (e.g., a part of or the entire CoMP cooperating set of RRUs 155) at a time. RRU 155 includes an interface to communicate with BUU 160. According to exemplary implementation, RRU 155 includes an Ethernet interface. The communication interface provides communication between RRU 155 and BBU 160 via links 614-1-614-3 (also referred to collectively as links 614 and, generically and individually as link 614). Links 614 may be implemented as optical fibers.

BBU 160 includes logic that manages scheduling and baseband processing pertaining to RRUs 155. According to an exemplary embodiment, BBU 160 includes a communication interface to receive the data bits and channel information from RRU 155. For example, the communication interface may be implemented as an Ethernet interface. According to an exemplary embodiment, BBU 160 includes logic that provides the correction service.

Core network 620 includes a complementary network pertaining to access network 605, as described above, such as the core part of the LTE network or the LTE-A network.

For example, although not illustrated, core network 620 includes a mobility management entity (MME), a serving gateway (SGW), a packet data network gateway (PGW), and so forth. Depending on the implementation, core network 620 may also include other network elements pertaining to various network-related aspects, such as billing, security, authentication and authorization, network polices, subscriber profiles, etc.

Figure 7A:
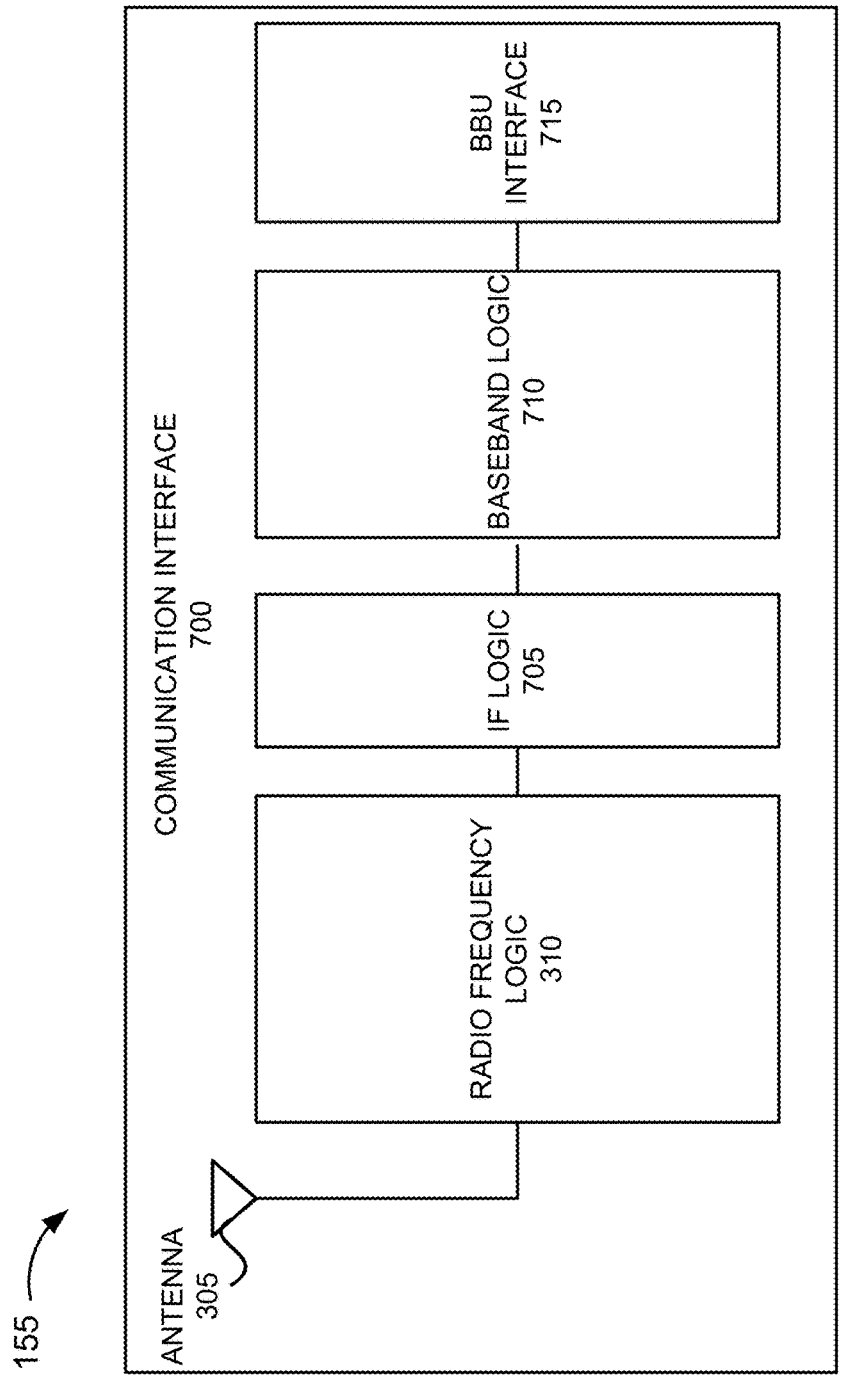
FIG. 7A is a diagram illustrating an exemplary communication interface of an RRU.

FIG. 7A is a diagram illustrating an exemplary communication interface of RRU 155. As illustrated, a communication interface 700 includes antenna 305, radio frequency logic 310, intermediate frequency logic 705, baseband logic 710, and a BBU interface 715. Antenna 305 and radio frequency logic 310 has already been described. IF logic 705 may include logic similar to IF logic 340. Baseband logic 710 may include cyclic prefix adder 346, cyclic prefix remover 348, IFFT 350, FFT 352, a P/S module, and an S/P module. BBU interface 715 is a communication interface to BBU 160. For example, BBU interface 715 may be implemented as an Ethernet interface.

Figure 7B:
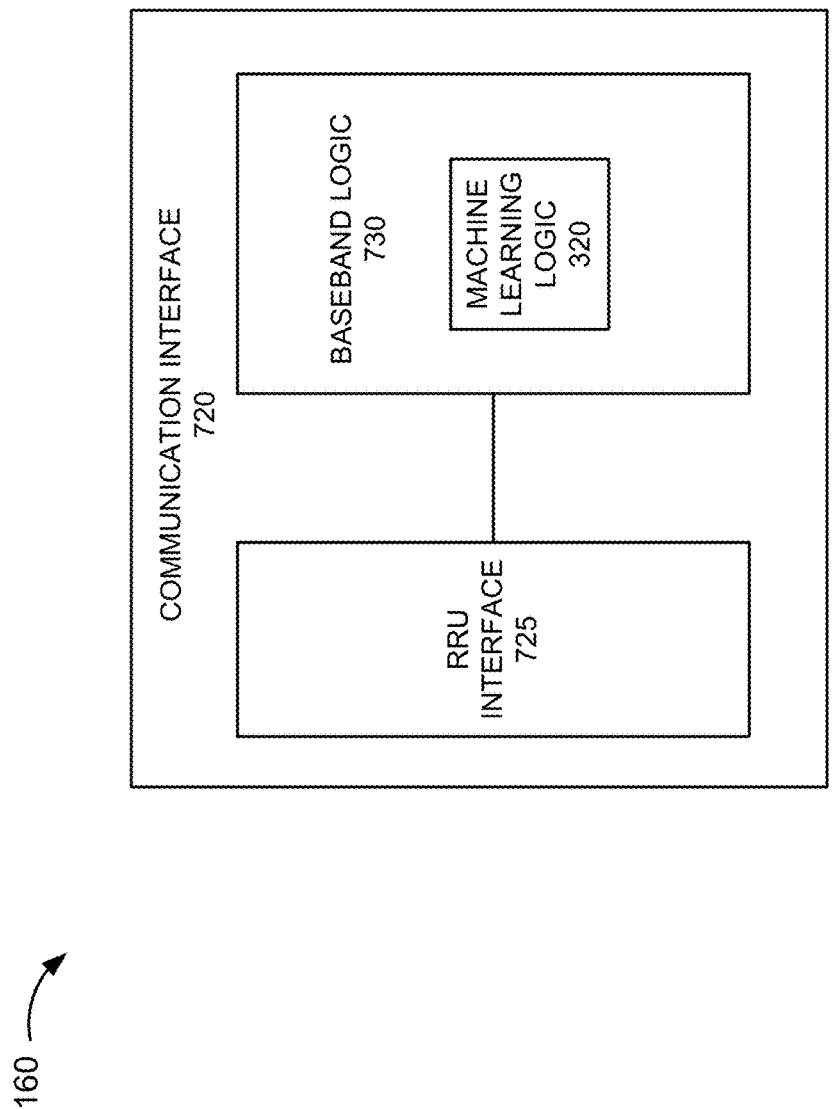
FIG. 7B is a diagram illustrating an exemplary communication interface of a BBU.

FIG. 7B is a diagram illustrating an exemplary communication interface of BBU 160. As illustrated, a communication interface 720 includes an RRU interface 725 and baseband logic 730. RRU interface 725 is a communication interface to RRU 155. For example, RRU interface 725 may be implemented as an Ethernet interface. Baseband logic 730 includes machine learning logic 320. Baseband logic 730 may also include interleaver 358, de-interleaver 360, encoder 362, decoder 364, a P/S module, an S/P module, and a beam coordination function. BBU 160 may provide the correction service as described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 5A-5C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 210, etc.), or a combination of hardware and software (e.g., software 220). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 215.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method comprising:
   storing, by a device, default constellation data;
   receiving, by the device, data and first channel information pertaining to a transmission of the data;
   converting, by the device, the data into first constellation data;
   demodulating, by the device, the first constellation data based on the default constellation data;
   determining, by the device, whether any error exists based on the demodulating of the first constellation data;
   transmitting, by the device, a request for retransmission based on determining that an error exists;
   receiving, by the device, retransmitted data and second channel information;
   converting, by the device, the retransmitted data into second constellation data;
   demodulating, by the device, the second constellation data based on the default constellation data;
   determining, by the device, whether any error exists based on the demodulating of the second constellation data;
   calculating, by the device, error vector magnitude data based on the demodulated first constellation data and the demodulated second constellation data in response to determining that no error exists;
   generating, by the device, corrective constellation data based on the error vector magnitude data, the first channel information, and the second channel information, wherein the corrective constellation data includes at least one reference constellation point that corresponds to a repositioning on a constellation plane of at least one default reference constellation point of the default constellation data; and using, by the device, the corrective constellation data instead of the at least one default reference constellation point of the default constellation data when demodulating additional data that is subsequently received by the device.

2. The method of claim 1, wherein the using comprises:
obtaining, by the device, third channel information pertaining to the additional data;
comparing, by the device, the third channel information to the first channel information and the second channel information; and
using, by the device, the corrective constellation data for demodulating when the third channel information pertaining to the additional data matches the first channel information and the second channel information.

3. The method of claim 1, further comprising:
decoding, by the device, the demodulated first constellation data into first bit data; and
identifying, by the device, that a bit error exists in response to the decoding, and wherein the determining whether any error exists further comprises:
determining that the error exists in response to the identifying.

4. The method of claim 3, further comprising:
storing, by the device, the first bit data that includes the bit error;
decoding, by the device, the demodulated second constellation data into second bit data;
identifying, by the device, that a bit error does not exist in response to the decoding of the demodulated second constellation data;
storing, by the device, the second bit data in which no error exists;
comparing, by the device, a position of a constellation point of the default constellation data corresponding to the first bit data to a position of a constellation point of the default constellation data corresponding to the second bit data; and
selecting, by the device, the at least one default reference constellation point of the default constellation data based on the comparing, and wherein the calculating further comprises:
calculating, by the device, the error vector magnitude data based on the selecting.

5. The method of claim 1, wherein the default constellation data is one of an M-Quadrature Amplitude Modulation (QAM) constellation data or a Quadrature Phase Shift Keying (QPSK) constellation data.

6. The method of claim 1, wherein the using comprises:
counting, by the device, a number of retransmissions to obtain the retransmitted data in which no error exists for the retransmitted data;
comparing, by the device, the number to a threshold value;
using, by the device, the corrective constellation data instead of the default constellation data when the number is equal to or greater than the threshold value; and
continue using, by the device, the default constellation data when the number is less than the threshold value.

7. The method of claim 1, wherein the first channel information and the second channel information each includes at least one of a signal-to-interface-plus-noise ratio (SINK), a received signal strength indicator (RSSI), or a channel quality indicator (CQI).

8. The method of claim 1, wherein the generating is based on using an instance-based learning algorithm that uses the error vector magnitude data, the first channel information, and the second channel information to identify a pattern of error.

9. A device comprising:
a communication interface;
a memory, wherein the memory stores instructions; and
a processor, wherein the processor executes the instructions to:
store default constellation data in the memory;
receive, via the communication interface, data and first channel information pertaining to a transmission of the data;
convert the data into first constellation data;
demodulate the first constellation data based on the default constellation data;
determine whether any error exists based on the demodulation of the first constellation data;
transmit, via the communication interface, a request for retransmission based on a determination that an error exists;
receive, via the communication interface, retransmitted data and second channel information;
convert the retransmitted data into second constellation data;
demodulate the second constellation data based on the default constellation data;
determine whether any error exists based on the demodulation of the second constellation data;
calculate error vector magnitude data based on the demodulated first constellation data and the demodulated second constellation data in response a determination that no error exists;
generate corrective constellation data based on the error vector magnitude data, the first channel information, and the second channel information, wherein the corrective constellation data includes at least one reference constellation point that corresponds to a repositioning on a constellation plane of at least one default reference constellation point of the default constellation data; and
use the corrective constellation data instead of the at least one default reference constellation point of the default constellation data when demodulating additional data that is subsequently received via the communication interface.

10. The device of claim 9, wherein when using the corrective constellation data, the processor further executes the instructions to:
obtain third channel information pertaining to the additional data;
compare the third channel information to the first channel information and the second channel information; and
use the corrective constellation data for demodulating when the third channel information pertaining to the additional data matches the first channel information and the second channel information.

11. The device of claim 9, wherein the processor further executes the instructions to:
decode the demodulated first constellation data into first bit data; and
identify that a bit error exists in response to the decoding, and wherein when a determination is made as to whether any error exists, the processor further executes the instructions to:
determine that the error exists in response to the identification that the bit error exists.

12. The device of claim 11, wherein the processor further executes the instructions to:
  store the first bit data that includes the bit error;
  decode the demodulated second constellation data into second bit data;
  identify that a bit error does not exist in response to the decoding of the demodulated second constellation data;
  store the second bit data in which no error exists;
  compare a position of a constellation point of the default constellation data corresponding to the first bit data to a position of a constellation point of the default constellation data corresponding to the second bit data; and
  select the at least one default reference constellation point of the default constellation data based on a result of the comparison, and wherein when calculating, the processor further executes the instructions to:
  calculate the error vector magnitude data based on the selection of the at least one default reference constellation point.

13. The device of claim 9, wherein the default constellation data is one of an M-Quadrature Amplitude Modulation (QAM) constellation data or a Quadrature Phase Shift Keying (QPSK) constellation data, and wherein the device is one of a wireless user device or a wireless network device.

14. The device of claim 9, wherein when using the corrective constellation data, the processor further executes the instructions to:
  count a number of retransmissions to obtain the retransmitted data in which no error exists for the retransmitted data;
  compare the number to a threshold value;
  use the corrective constellation data instead of the default constellation data when the number is equal to or greater than the threshold value; and
  continue to use the default constellation data when the number is less than the threshold value.

15. The device of claim 9, wherein the first channel information and the second channel information each includes at least one of a signal-to-interface-plus-noise ratio (SINR), a received signal strength indicator (RSSI), or a channel quality indicator (CQI).

16. A non-transitory storage medium storing instructions executable by a processor of a device to:
  store default constellation data;
  receive data and first channel information pertaining to a transmission of the data;
  convert the data into first constellation data;
  demodulate the first constellation data based on the default constellation data;
  determine whether any error exists based on the demodulation of the first constellation data;
  transmit a request for retransmission based on a determination that an error exists;
  receive retransmitted data and second channel information;
  convert the retransmitted data into second constellation data;
  demodulate the second constellation data based on the default constellation data;
  determine whether any error exists based on the demodulation of the second constellation data;
  calculate error vector magnitude data based on the demodulated first constellation data and the demodulated second constellation data in response a determination that no error exists pertaining to the retransmitted data;
  generate corrective constellation data based on the error vector magnitude data, the first channel information, and the second channel information, wherein the corrective constellation data includes at least one reference constellation point that corresponds to a repositioning on a constellation plane of at least one default reference constellation point of the default constellation data; and
  use the corrective constellation data instead of the at least one default reference constellation point of the default constellation data when demodulating additional data that is subsequently received by the device.

17. The non-transitory storage medium of claim 16, wherein the instructions further comprise instructions to:
  decode the demodulated first constellation data into first bit data; and
  identify that a bit error exists in response to the decoding, and wherein the instructions to determine whether any error exists further comprise instructions to:
  determine that the error exists in response to the identification that the bit error exists.

18. The non-transitory storage medium of claim 17, wherein the instructions to further comprise instructions to:
  store the first bit data that includes the bit error;
  decode the demodulated second constellation data into second bit data;
  identify that a bit error does not exist in response to the decoding of the demodulated second constellation data;
  store the second bit data in which no error exists;
  compare a position of a constellation point of the default constellation data corresponding to the first bit data to a position of a constellation point of the default constellation data corresponding to the second bit data; and
  select the at least one default reference constellation point of the default constellation data based on a result of the comparison, and wherein the instructions to calculate further comprise instructions to:
  calculate the error vector magnitude data based on the selection of the at least one default reference constellation point.

19. The non-transitory storage medium of claim 16, wherein the first channel information and the second channel information each includes at least one of a signal-to-interface-plus-noise ratio (SINR), a received signal strength indicator (RSSI), or a channel quality indicator (CQI).

20. The non-transitory storage medium of claim 16, wherein the instructions to use further comprise instructions to:
  obtain current channel conditions; and
  select the corrective constellation data from among multiple corrective constellation matrices based on channel information mapped to the corrective constellation data that matches the current channel conditions.

* * * * *